(12) United States Patent
Colussi et al.

(10) Patent No.: US 11,052,712 B2
(45) Date of Patent: Jul. 6, 2021

(54) TIRE PRESSURE INDICATING DEVICE

(71) Applicants: Primo Antonio Colussi, Santa Fe (AR); Natalio Domingo Venica, Santa Fe (AR)

(72) Inventors: Primo Antonio Colussi, Santa Fe (AR); Natalio Domingo Venica, Santa Fe (AR)

(73) Assignee: COL-VEN S.A., Santa Fe (AR)

( * ) Notice: Subject to any disclaimer, the term of this patent is extended or adjusted under 35 U.S.C. 154(b) by 263 days.

(21) Appl. No.: 16/023,285

(22) Filed: Jun. 29, 2018

(65) Prior Publication Data
US 2019/0299726 A1 Oct. 3, 2019

(30) Foreign Application Priority Data

Apr. 3, 2018 (AR) .............................. 201800100805

(51) Int. Cl.
*B60C 23/04* (2006.01)
*B60C 29/00* (2006.01)
*B60C 23/00* (2006.01)

(52) U.S. Cl.
CPC .......... *B60C 29/005* (2013.01); *B60C 23/003* (2013.01); *B60C 23/0496* (2013.01); *B60C 23/0405* (2013.01)

(58) Field of Classification Search
None
See application file for complete search history.

(56) References Cited

U.S. PATENT DOCUMENTS

| | | | | |
|---|---|---|---|---|
| 1,478,506 A | * | 12/1923 | Bromberg | B60C 23/0496 137/227 |
| 1,497,441 A | * | 6/1924 | Henemier | B60C 23/0496 73/146.3 |
| 1,803,270 A | * | 4/1931 | Morrison | B60C 23/0496 137/227 |
| 2,476,706 A | * | 7/1949 | Crowley | B60C 23/0496 137/229 |
| 3,866,563 A | * | 2/1975 | Bluem | B60C 23/0496 116/34 R |
| 4,244,214 A | * | 1/1981 | Curran | B60C 23/0496 116/34 R |
| 4,901,747 A | * | 2/1990 | Yabor | B60C 23/0496 116/34 R |
| 6,561,212 B1 | * | 5/2003 | Hsu | B60C 23/0496 137/224 |
| 2005/0072349 A1 | * | 4/2005 | Perlin | B60C 23/0496 116/34 B |

* cited by examiner

*Primary Examiner* — Jill E Culler
(74) *Attorney, Agent, or Firm* — Howard M. Gitten, Esq.; Lewis Brisbois Bisgaard & Smith, LLP

(57) ABSTRACT

A tire inflation viewing device that enables to view the proper operation of the inflation arrangements and that, in turn, enables to determine which of all of the tires is being inflated and has an air leak.

4 Claims, 2 Drawing Sheets

TIRE PRESSURE INDICATING DEVICE

CROSS REFERENCE TO RELATED APPLICATIONS

This application claims the benefit of Argentine Application No. 201800100805 filed Apr. 3, 2018.

FIELD OF THE INVENTION

This invention relates to the field of devices, apparatus, and arrangements employed for inflating tires and, more particularly, it relates to a device that makes it possible to view the proper operation of inflation arrangements when at least one of the tires is losing air, while, in turn, it also enables to determine which tires are damaged. Even when in this description reference is made to a viewing device used in self-inflating arrangements, it should be clear that the device of this invention may be considered, adapted and used for any form of tire inflation or the like without any inconvenience.

DESCRIPTION OF THE PRIOR ART

Self-inflating arrangements of vehicle wheels, especially heavy transport vehicles, such as trailers, trucks, buses and the like, are well known in the field of the art and it is known that they enable the automatic inflation of the wheel upon an eventual air loss or leak during the journey. These arrangements usually use the compressed air in the vehicle air system in order to inflate a tire that has a leak or low pressure during the journey. The self-inflating arrangements connect to all of the vehicle tires and are controlled to supply air and maintain the tires at the desired pressure, even when the vehicle is in motion. When the air pressure drops below the level recommended by the tire manufacturer, the inflating arrangement automatically activates the air paths through a control box and uses the gap between the vehicle shafts to transfer the air flow with which the tires are inflated at a low pressure.

To such effect, a supporting assembly is generally mounted on the vehicle halfshaft, wherein said support comprises a plurality of fixing elements to the halfshaft cover and a housing wherein an outer rotor is coupled thereto, said outer rotor being provided with a plurality of valves that are connected to the wheel valves by means of respective conduits. Both the outer rotor and the support rotate together with the rotatory motion of the wheel. Likewise, the outer rotor comprises an adaptation mechanism which is static with regard to the wheel rotation and the supporting and rotor assembly and is operatively connected to a hose or conduit extending into the vehicle shaft and by means of which the air from the compressed air outer tank of the vehicle circulates to perform the automatic inflation of the tires in the event of a puncture or air leak.

Although the self-inflating arrangements have been beneficial in practice, some inconveniences are still present, more particularly when one or more deflated tires are being inflated by the self-inflation arrangement. In practice, it is difficult to view whether the air correctly enters and/or circulates from the compressed air outer tank towards the respective conduits being connected to the tire inflation valves. In turn and in practice, it is also difficult to determine which of all of the tires is deflated and is being inflated at the time, which is a big inconvenience if one of them is to be repaired or replaced.

Accordingly, it is desired to have a new arrangement, device or support that enables one to view the proper air circulation to perform the tire inflation and identify which tire is being inflated.

BRIEF DESCRIPTION OF THE INVENTION

It is an object of the invention to provide a new device that enables one to view the proper operation of self-inflating arrangements.

It is still a further object of the invention to provide a viewing device that enables one to determine which of all of the tires is being inflated.

It is still a further object of the invention to provide a viewing device wherein through a viewing area and a one-way air path assembly it makes it possible to determine the proper air circulation to perform the tire inflation.

It is a further object of the present invention to provide an inflation viewing device that may be adapted and used in any inflating arrangement.

It is a further object of the present invention to provide an inflation viewing device comprising at least a main body that is externally provided with at least a translucent viewing portion and internally provided with at least a one-way air path assembly, at least an air entrance connector being operatively connected to an external air source and to one of the ends of said main body, and at least an air exit connector being connected to the other main body end and to at least one inflation valve.

BRIEF DESCRIPTION OF THE DRAWINGS

For the purpose of providing more clarity and a better understanding of the subject-matter of the invention, it has been illustrated in several figures, in which the invention has been represented by way of example in a preferred embodiment wherein.

DETAILED DESCRIPTION OF THE INVENTION

Figure 1:
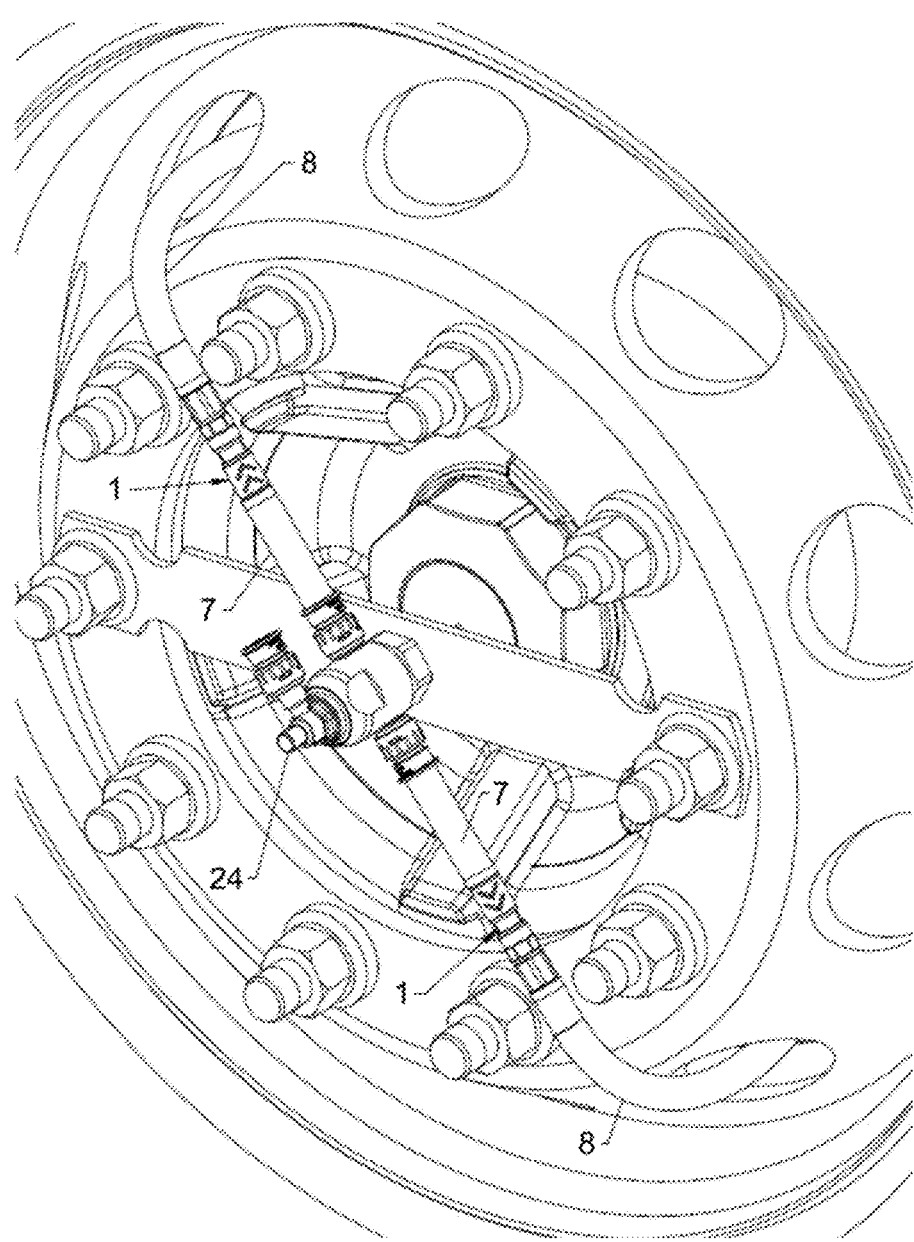
FIG. 1 is a perspective view of the viewing device of this invention being mounted on a self-inflating arrangement.

By making reference now to the figures, it may be seen that the invention is a new device that enables one to view the proper operation of inflating arrangements, more particularly whether air is properly circulating while, in turn, it also enables one to determine which of all of the tires is being inflated. Although reference is made in this description to the fact that the device of the invention is used in self-inflating arrangements, it is to be understood that by "inflating arrangements" it is meant any type of arrangement that enables the inflation of a tire or the like, whether they are either known self-inflating arrangements of truck trailers, buses, etc., or the conventional inflating arrangements used for inflating tires of vehicles, bikes, motorbikes, etc. at service stations or "tire workshops".

Accordingly and according to FIGS. 1 to 4, the inflation viewing device of this invention is shown by the general reference number 1 and comprises at least one main body 2 that may be externally provided with at least one translucent viewing portion 3 and internally provided with at least one one-way air path assembly 4. Preferably, in this invention, but without limitation, the main body 2 is translucent along its whole length whereby the viewing portion 3 is viewable by the user. Furthermore, said main body 2 has an end being connected to at least an air entrance connector 5 and an opposite end being connected to an air exit connector 6. Said air entrance connector 5 is operatively connected to an external air source through respective conduits 7 (not shown), a rotor 24, and the like, which are well known in the art of self-inflating arrangements and, consequently, no details shall be provided about the operation thereof. Likewise, said air exit connector 6 is connected to a tire inflation valve (not shown) through respective conduits 8.

Furthermore, internally between said main body 2 and the air entrance connector 5 a guide spacer 9 is provided 9 which, together with respective sealing rings 10, holds the main body held between connectors 5 y 6. The guide spacer 9 has an inner passage 11, which has a wider section 12 in communication with an inner passage 13 of the main body 2 and a reduced section that defines an opening 14 that communicates with the air entrance connector 5. It is to be noted that the inner passage 13 of the main body 2 has a guide section 15 and a reduced section extending to a seat 16 that is communicated with the air exit connector 6, and the one-way air path assembly 4 is located therein.

Figure 2:
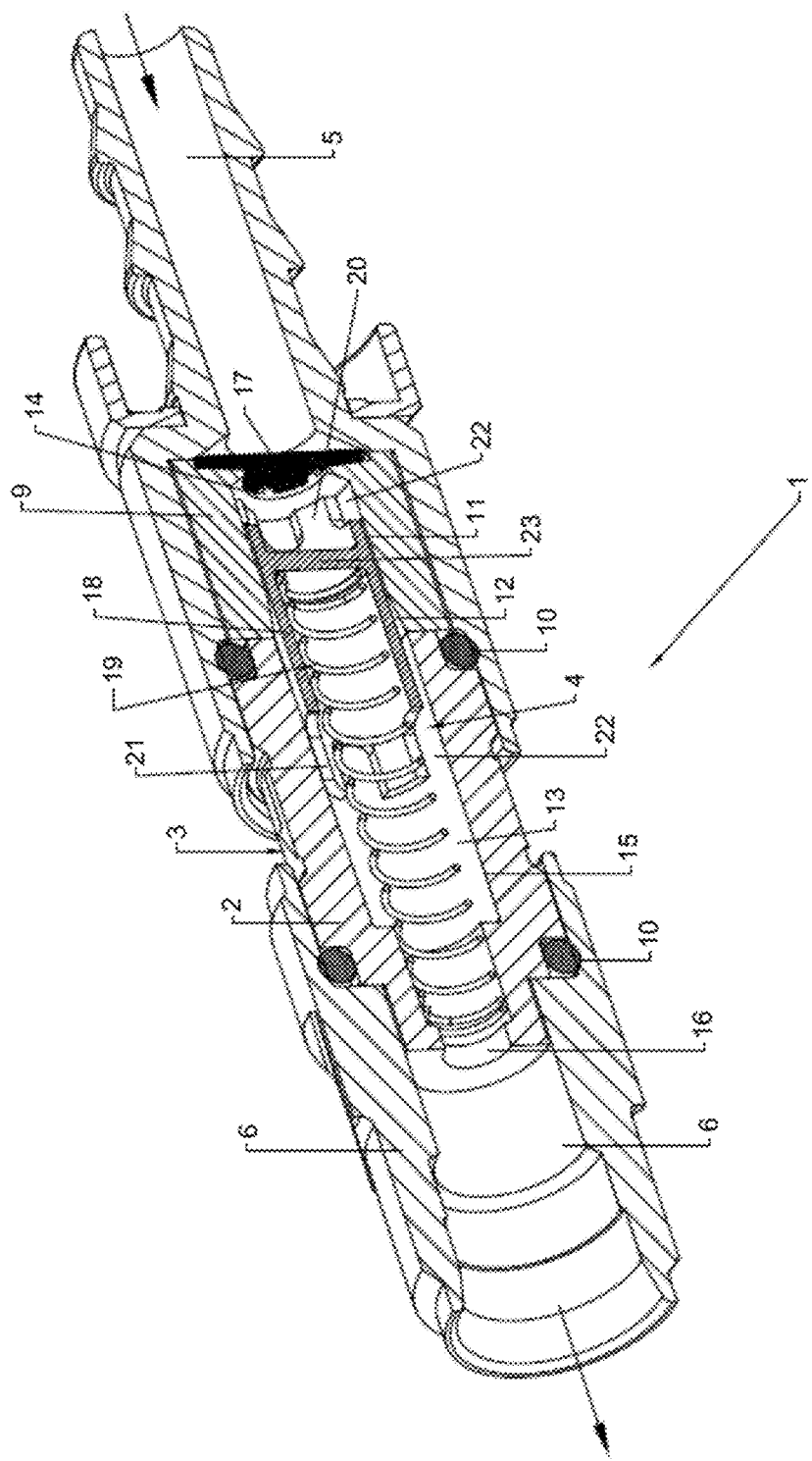
FIG. 2 is a perspective and section view of the viewing device of this invention.

With regard to the one-way air path assembly 4 of this invention, it consists of at least one filter 17 arranged in the communication opening 14 of the inner passage 11 of the guide spacer 9, at least a plunger 18 that is slidably guided through the inner passage 11 of the guide spacer 9 and the guide section 15 of the inner passage 13 of the main body 2, and at least a spring 19 being held between the plunger 18 and said seat 16 of the main body 2. As illustrated in FIG. 2, the plunger 18 comprises on the ends respective expansible fingers 20 and 21 which are separated between each other in such a way that they define air circulation channels or pathways 22. Likewise, the plunger 18 has a blind wall 23 which prevents the involuntary air circulation from passing through the tire inflation valve.

Figure 3:
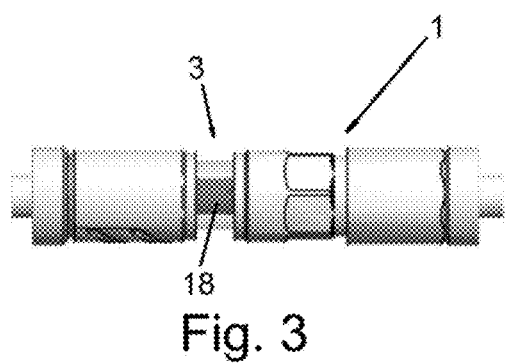
FIG. 3 is an exemplary schematic view of an operation position of the viewing device of this invention, wherein the air circulation occurs.
Figure 4:
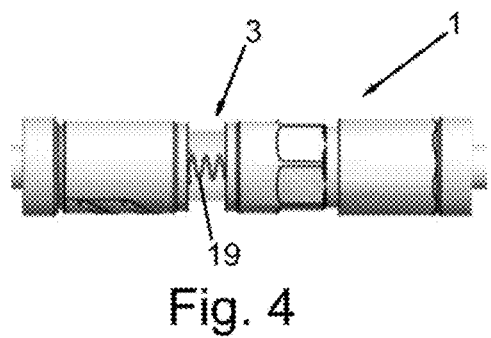
FIG. 4 is an exemplary schematic view of another operation position of the viewing device of this invention, wherein there is no air circulation.

With regard to FIGS. 3 and 4, said viewing portion 3 is made of a translucent material selected from the group consisting of acrylic, glass, or a combination thereof. The use of a translucent "glazed" portion enables the inner view of the device of the invention and it is to be noted that said translucent glazed portion is resistant to hydrocarbons. Upon activation of the self-inflating arrangement, the air coming from the external compressed air source provides enough force to overcome the force of spring 19 thus moving the plunger 18. This movement makes it possible to view the plunger 18 through the translucent viewing portion 3, as illustrated in FIG. 3, whereby it may be determined that air is entering through the pipe to the tire.

The movement of the plunger 18 is performed by expansible fingers 20 and 21 that are slidably guided through the inner passage 11 of the guide spacer 9 and of the section guide 15 of the main body 2. In turn, the movement of the plunger 18 is limited by the expansible fingers 21 that stop against the reduced section of the inner passage 13 of the main body 2, thus keeping the plunger in a guided way so that there are no alterations in its operative position. Upon movement of the plunger 18 which is viewed through the translucent viewing portion 3, the compressed air passes through the air circulation channels or pathways 22 defined between the expansible fingers 20, circulates through the space defined between the inner wall of the inner passage of the main body and the external wall of the plunger, passes through the air circulation channels or pathways 22 defined between the expansible fingers 21 and continue its path through the exit connector 6 towards the respective inflation valves in order to carry out the tire inflation. If no air circulates or if there is not enough air to overcome the spring strength and cause the plunger movement, only the spring 19 will be viewed through the viewing portion 3 as illustrated in FIG. 4.

It is in this way that the inflation viewing device of this invention is constituted and built, which not only enables one to see whether the air circulation is proper but also enables one to determine within the circuits comprised in a tire gage which of all of the tires is being inflated and has a leak. The invention is not limited to self-inflating arrangements since it may be considered, adapted and used in conventional inflating arrangements or in air pressurization networks. Furthermore, although the device of the invention has been illustrated as being arranged between a connection conduit to the rotor (which may either internal or external) and the connection conduit to the inflation valve, it does not imply that the invention is limited to said arrangement, but, instead, it may be provided in any type of connection of an air pressurized network or in any type of conventional inflation arrangement. It is also to be noted that the translucent viewing portion is resistant to hydrocarbons.

The invention claimed is:

1. An inflation viewing device comprising:
   at least a main body which is externally provided with at least one translucent viewing portion and internally provided with at least a one-way air path assembly,
   at least one air entrance connector being operatively connected to an external air source and to a first end of said main body, and
   at least an air exit connector being connected to a second, opposed end of the main body and to at least one inflation valve,
   said main body having an inner passage wherein the one-way air path assembly is arranged,
   a guide spacer provided between said air entrance connector and the main body, said guide spacer having an inner passage which has a wider section that is in communication with the inner passage of the main body and a reduced section that defines a communication opening with the air entrance connector,
   said one-way air path assembly having a communication opening of the inner passage of the guide spacer, at least one filter disposed in the communication opening, at least one slidably guided plunger slidably disposed within the inner passage of the guide spacer and guide section of the inner passage of the main body, and at least one spring being held between the plunger and said seat of the main body, and
   a first end and a second end of said plunger comprise respective expansible fingers which are separated between each other, defining air circulation channels or pathways.

2. The viewing device according to claim 1, characterized in that said viewing portion is made of a translucent material selected from the group consisting of acrylic, glass or a combination thereof.

3. The viewing device according to claim 1, further comprising two or more compromising sealer rings disposed about the main body, and said main body is held between an air entrance connector and an exit connectors through respective sealing rings.

4. The viewing device according to claim 1, characterized in that the inner passage of the main body has a guide section and a reduced section extending towards a seat that is in communication with the air exit connector.

* * * * *

UNITED STATES PATENT AND TRADEMARK OFFICE
CERTIFICATE OF CORRECTION

| | |
|---|---|
| PATENT NO. | : 11,052,712 B2 |
| APPLICATION NO. | : 16/023285 |
| DATED | : July 6, 2021 |
| INVENTOR(S) | : Primo Antonio Colussi |

It is certified that error appears in the above-identified patent and that said Letters Patent is hereby corrected as shown below:

On the Title Page

Item (30): Foreign Application Priority Data - "201800100805" should be -- P20180100805 --

Signed and Sealed this
Eighth Day of March, 2022

Drew Hirshfeld
*Performing the Functions and Duties of the
Under Secretary of Commerce for Intellectual Property and
Director of the United States Patent and Trademark Office*